(12) United States Patent
Zhai et al.

(10) Patent No.: US 10,038,482 B2
(45) Date of Patent: Jul. 31, 2018

(54) DEVICE AND METHOD FOR GENERATING PRECODING MATRIX, AND STORAGE MEDIUM

(71) Applicant: Sanechips Technology Co., Ltd., Shenzhen, Guangdong (CN)

(72) Inventors: Chunhua Zhai, Shenzhen (CN); Xinmin Wang, Shenzhen (CN)

(73) Assignee: SANECHIPS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/513,742

(22) PCT Filed: Feb. 3, 2015

(86) PCT No.: PCT/CN2015/072146
§ 371 (c)(1),
(2) Date: Mar. 23, 2017

(87) PCT Pub. No.: WO2016/045292
PCT Pub. Date: Mar. 31, 2016

(65) Prior Publication Data
US 2017/0288749 A1   Oct. 5, 2017

(30) Foreign Application Priority Data
Sep. 24, 2014   (CN) .......................... 2014 1 0493837

(51) Int. Cl.
*H04B 7/0456*   (2017.01)
*H04B 7/06*   (2006.01)

(52) U.S. Cl.
CPC ......... *H04B 7/0456* (2013.01); *H04B 7/0639* (2013.01)

(58) Field of Classification Search
CPC .......................... H04B 7/0639; H04B 7/0456
See application file for complete search history.

(56) References Cited

U.S. PATENT DOCUMENTS 8,311,144 B1 * 11/2012 Sun ................... H04L 25/03343
375/267
2008/0273624 A1   11/2008 Kent
(Continued)

FOREIGN PATENT DOCUMENTS

CN   101877684 A   11/2010
CN   102082635 A   6/2011
(Continued)

OTHER PUBLICATIONS

International Search Report in international application No. PCT/CN2015/072146, dated May 27, 2015, 2 pgs.
(Continued)

*Primary Examiner* — Syed Haider
(74) *Attorney, Agent, or Firm* — Cooper Legal Group, LLC

(57) ABSTRACT

The disclosure discloses a device for generating a precoding matrix. The device includes: a parameter calculator, a counter and an element generating module. The parameter calculator is configured to calculate, according to a first Precoding Matrix Identifier (PMI) and a second PMI, a first parameter and a second parameter used for determining a precoding matrix, and send the first parameter and the second parameter to the element generating module. The counter is configured to control the row numbers of elements in the precoding matrix that are generated by the element generating module. The element generating module is configured to generate the elements corresponding to the row numbers in the precoding matrix according to the received first parameter and second parameter and the row numbers. The disclosure also discloses a method for generating a precoding matrix, and a storage medium.

13 Claims, 2 Drawing Sheets

(56) References Cited

U.S. PATENT DOCUMENTS

| | | | | |
|---|---|---|---|---|
| 2012/0082190 A1* | 4/2012 | Zhu | ................... | H04B 7/063 |
| | | | | 375/219 |
| 2012/0314590 A1* | 12/2012 | Choudhury | .......... | H04B 7/0452 |
| | | | | 370/252 |
| 2013/0070723 A1 | 3/2013 | Yie | | |
| 2014/0119467 A1* | 5/2014 | Tee | ................. | H04B 7/0695 |
| | | | | 375/267 |
| 2014/0369436 A1 | 12/2014 | Zhang | | |
| 2017/0238323 A1* | 8/2017 | Marinier | ............ | H04W 72/06 |
| | | | | 370/329 |

FOREIGN PATENT DOCUMENTS

| | | |
|---|---|---|
| CN | 102244565 A | 11/2011 |
| CN | 102651676 A | 8/2012 |
| CN | 103004104 A | 3/2013 |
| CN | 103051420 A | 4/2013 |
| CN | 103188032 A | 7/2013 |
| EP | 2779500 A1 | 9/2014 |

OTHER PUBLICATIONS

English Translation of the Written Opinion of the International Search Authority in international application No. PCT/CN2015/072146, dated May 27, 2015, 7 pgs.

ETSI TS 136.211 "Evolved Universal Terrestrial Radio Access (E-UTRA); Physical Channels and Modulation (#GPP TS36.211 version 10.0.0 Release 10, e 10 ", Jan. 1, 2011, European Telecommunications Standards Institute 2011, Retrieved from the Internet: URL:http: // www.etsi.org/deliver/etsi_ts/136200_ 136299/136211/ 10.00.00_60/ts_ 136211v1 00000p.pdf, 105 pgs.

Supplementary European Search Report in European application No. 15844462.0, dated Aug. 1, 2017, 10 pgs.

* cited by examiner

DEVICE AND METHOD FOR GENERATING PRECODING MATRIX, AND STORAGE MEDIUM

TECHNICAL FIELD

The disclosure relates to the field of mobile communications, and in particular to a device and method for generating a precoding matrix, and a storage medium.

BACKGROUND

With the widespread use of the Multiple-Input Multiple-Output (MIMO) technology in a Long Term Evolution (LTE) communication system, especially with the increase of the number of antenna ports defined by a user-specified reference signal, an LTE terminal must accurately and quickly generate a precoding matrix required for channel quality calculation.

At present, the commonly used method for generating a precoding matrix is storing all possible precoding matrices by providing a large storage device. However, with the increase of the number of antenna ports, the number of the precoding matrices increases rapidly. In this case, storing all the precoding matrices needs a very expensive storage device, causing the cost of the terminal to increase.

SUMMARY

To solve the existing technical problems, the disclosure is intended to provide a device and method for generating a precoding matrix, and a storage medium in the embodiments, which can generate a precoding matrix through simple calculation and table lookup, thereby avoiding consuming a large number of storage units.

The technical solutions of the disclosure are implemented as follows.

On the first aspect, a device for generating a precoding matrix is provided, which includes: a parameter calculator, a counter and an element generator.

The parameter calculator is arranged to calculate, according to a first Precoding Matrix Identifier (PMI) and a second PMI, a first parameter and a second parameter for determining a precoding matrix, and send the first parameter and the second parameter to the element generator.

The counter is arranged to control a row number of an element in the precoding matrix that is to be generated by the element generator.

The element generator is arranged to generate the element corresponding to the row number in the precoding matrix according to the received first parameter and second parameter and the row number.

In an embodiment of the disclosure, the element generator includes: a first lookup table unit, a second lookup table unit, a first lookup table address unit, and an element output control unit.

The first lookup table unit is arranged to store values of elements from the zeroth row to the third row in the precoding matrix calculated in advance, and obtain, according to a base address input by the first lookup table address unit, a value of the corresponding element and output the value of the corresponding element.

The second lookup table unit is arranged to store values of operator influencing elements from the fourth row to the seventh row in the precoding matrix calculated in advance, inquire the value of the operator according to the second parameter, calculate the product of the value of the element output by the first lookup table unit and the value of the operator, and send the product to the element output control unit as the value of the corresponding element from the fourth row to the seventh row in the precoding matrix.

The first lookup table address unit is arranged to generate the base address of the first lookup table unit according to the first parameter and the row number, and send the base address to the first lookup table unit.

The element output control unit is arranged to receive inputs of the first lookup table unit and the second lookup table unit, and output the element corresponding to the row number in the precoding matrix according to the row number input by the counter.

In an embodiment of the disclosure, the first lookup table address unit is implemented by a four-to-one multiplexer.

In an embodiment of the disclosure, the element output control unit is implemented by a two-to-one multiplexer.

In an embodiment of the disclosure, the precoding matrix is:

$$W_{m,n}^{(1)} = \frac{1}{\sqrt{8}} \begin{bmatrix} v_m \\ \phi_n v_m \end{bmatrix}, \text{ where } v_m = [\,1\ \ e^{j2\pi m/32}\ \ e^{j4\pi m/32}\ \ e^{j6\pi m/32}\,]^T,$$

$\phi_n = e^{j\pi n/2}$, e is a natural number, π is Pi, and the parameters m and n are calculated by an LTE terminal according to the first PMI and the second PMI.

On the second aspect, a method for generating a precoding matrix is provided, which includes the following steps: the first parameter and the second parameter for determining the precoding matrix are calculated according to the first PMI and the second PMI; a row number of an element in the precoding matrix is controlled by the counter; the element corresponding to the row number in the precoding matrix is generated in order according to the first parameter, the second parameter and the row number; and elements in the precoding matrix are output in an ascending order of row numbers.

In an embodiment of the disclosure, before the element corresponding to the row number in the precoding matrix are generated in order according to the first parameter, the second parameter and the row number, the method further includes the following steps: the values of the elements from the zeroth row to the third row in the precoding matrix are calculated in advance, and the corresponding relationships between the values of the elements and the first parameter are established, and the corresponding relationships are stored in the first lookup table; and the values of the operator influencing the elements from the fourth row to the seventh row in the precoding matrix calculated are calculated in advance, and corresponding relationships between the values of the operator and the second parameter are established, and the corresponding relationships are stored in the second lookup table.

In an embodiment of the disclosure, in order to generate the element corresponding to the row number in the precoding matrix in order according to the first parameter, the second parameter and the row number, the base address of the first lookup table is generated according to the first parameter and the row number; a value of a first element is obtained from the first lookup table according to the base address; the values of the operator are obtained from the second lookup table according to the second parameter; when the row number is from the zeroth row to the third row, the value of the first element is output as the value of the element corresponding to the row number in the precoding matrix; and when the row number is from the fourth row to the seventh row, the product of the value of the first element and the value of the operator is calculated and output as the value corresponding to the row number in the precoding matrix.

In an embodiment of the disclosure, in order to generate the base address of the first lookup table according to the first parameter and the row number, the base address of the first lookup table is generated according to the zeroth bit to the fourth bit of the first parameter and the zeroth bit to the first bit of the row number.

In an embodiment of the disclosure, the precoding matrix is:

$$W_{m,n}^{(1)} = \frac{1}{\sqrt{8}} \begin{bmatrix} v_m \\ \phi_n v_m \end{bmatrix}, \text{ where } v_m = \begin{bmatrix} 1 & e^{j2\pi m/32} & e^{j4\pi m/32} & e^{j6\pi m/32} \end{bmatrix}^T,$$

$\phi_n = e^{j\pi n/2}$, e is a natural number, π is Pi, and the parameters m and n are calculated by an LTE terminal according to the first PMI and the second PMI.

Through the values of elements from the zeroth row to the third row in the precoding matrix and the values of operator influencing the elements from the fourth row to the seventh row in the precoding matrix which are calculated in advance, and by skilfully using the first parameter, the second parameter and the row number, the device and method for generating a precoding matrix, and the storage medium provided by the disclosure can generate the elements of a precoding matrix through simple calculation and table lookup and then generate the precoding matrix, thereby avoiding consuming a large number of storage units to store various precoding matrices matrices.

DETAILED DESCRIPTION

In order to more clearly elaborate the technical solutions in embodiments of the disclosure, the technical solutions of the disclosure are elaborated below in combination with the accompanying drawings and the embodiments. Obviously, the described embodiments are only a part but not all of the embodiments of the disclosure. Based on the embodiments of the disclosure, all the other embodiments obtained by the ordinary skill in the art on the premise of not contributing creative effort belong to the scope of protection of the disclosure.

In an embodiment of the disclosure, the number of antennas of a base station communicating with an LET terminal is 1, so the number of layers of a precoding matrix for the LTE terminal to calculate a Channel Quality Indicator (CQI) is 1; $W_{m,n}^{(1)}$ represents a precoding matrix determined by parameters m and n whose the number of layers is 1;

$$W_{m,n}^{(1)} = \frac{1}{\sqrt{8}} \begin{bmatrix} v_m \\ \phi_n v_m \end{bmatrix}, \text{ where } v_m = \begin{bmatrix} 1 & e^{j2\pi m/32} & e^{j4\pi m/32} & e^{j6\pi m/32} \end{bmatrix}^T,$$

$\phi_n = e^{j\pi n/2}$, e is a natural number, π is pi, and the parameters m and n are calculated by the LTE terminal according to a first PMI and a second PMI; $W_{m,n}^{(1)}$ is actually an 8×1 matrix, so the precoding matrix can be obtained only by respectively calculating each element in the precoding matrix and then combining the eight elements in the precoding matrix. The first PMI and the second PMI are configured by the LTE terminal, and can be any integer in [0, 15]; in the practical application, they are 4-bit binary numbers.

Figure 1:
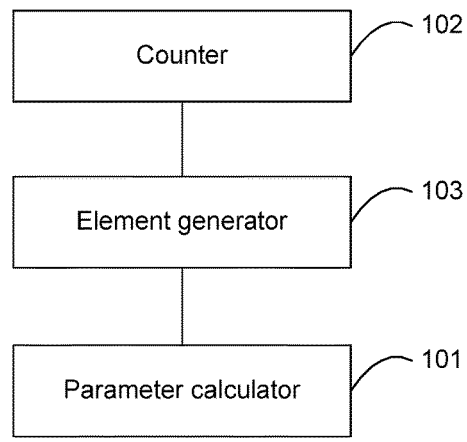
FIG. 1 is a structure diagram of a device for generating a precoding matrix according to an embodiment of the disclosure.

FIG. 1 is a structure diagram of a device for generating a precoding matrix according to an embodiment of the disclosure; as shown in FIG. 1, the device includes: a parameter calculator 101, a counter 102, and an element generator 103.

The parameter calculator 101 is arranged to calculate, according to the first PMI and the second PMI, the first parameter m and the second parameter n for determining the precoding matrix $W_{m,n}^{(1)}$, and send the first parameter m and the second parameter n to the element generator 103.

The counter 102 is arranged to control a row number of an element in the precoding matrix that are to be generated by the element generator 103.

The element generator 103 is arranged to generate the element in a (valid_cnt)th row in the precoding matrix according to the received first parameter m, the second parameter n and a row number valid_cnt.

Specifically, the parameter calculator 101 receives the first PMI and the second PMI configured by the terminal; the value of the first PMI is I1, the value of the second PMI is I2, then m=2×I1+I2[3:2], n=I2[1:0]; the calculated m and n are sent to the element generator 103. As mentioned above, I1 and I2 can be any integer in [0, 15], and in the practical application, they are 4-bit binary numbers.

Specifically, the counter 102 generates the row number of the element in the precoding matrix; the row number is marked as valid_cnt in a range is [0, 7], and in the practical application, it is a 3-bit binary number. The counter 102 sends the valid-cnt to the element generator 103, so as to control the element generator 103 to generate the element of which the row number is valid-cnt in the precoding matrix. The value of valid_cnt gradually increases from 0 to 7, so that the element generator 103 is controlled to gradually output the element in the zeroth row, the element in the first row . . . until the element in the seventh row, thereby generating the whole 8×1 precoding matrix.

Figure 2:
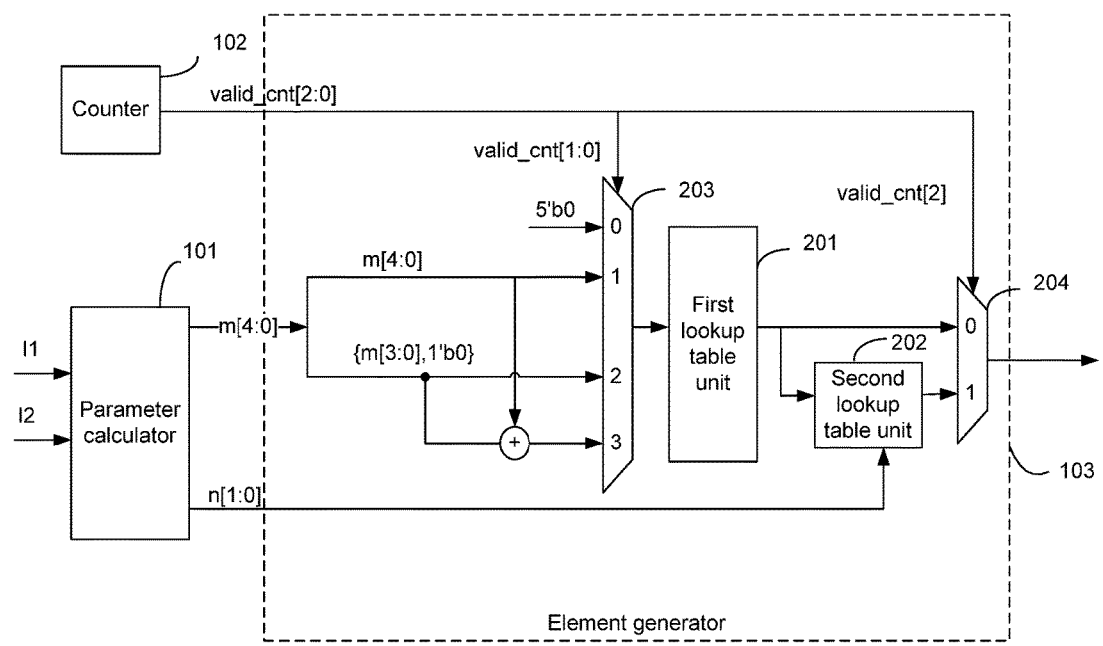
FIG. 2 is a schematic diagram showing the structure of an element generator and a connection relationship between the element generator and a parameter calculator and a counter in the device for generating the precoding matrix according to an embodiment of the disclosure.

In an embodiment, as shown in FIG. 2, the element generator 103 includes: a first lookup table unit 201, a second lookup table unit 202, a first lookup table address unit 203, and an element output control unit 204.

The first lookup table address unit 203 is arranged to generate a base address of the first lookup table unit according to the first parameter m and the row number valid_cnt, and send the base address to the first lookup table unit 201; here, the first lookup table address unit 203 may be implemented by a four-to-one multiplexer.

The first lookup table unit 201 is arranged to store values of elements from the zeroth row to the third row in the precoding matrix calculated in advance, and obtain, according to the base address input by the first lookup table address unit 203, a value of the corresponding element, and output the value of the corresponding element; here, the first lookup table unit 201 can be implemented by a Read-Only Memory (ROM) and an auxiliary circuit.

The second lookup table unit 202 is arranged to store values of an operator influencing elements from the fourth row to the seventh row in the precoding matrix calculated in advance, inquire a value of the operator according to the second parameter n, calculate the product of the value of the element output by the first lookup table unit 201 and the value of the operator, and send the product to the element output control unit 204 as the value of the corresponding element from the fourth row to the seventh row in the precoding matrix; here, the second lookup table unit 202 can be implemented by the ROM and the auxiliary circuit.

The element output control unit 204 is arranged to receive inputs of the first lookup table unit 201 and the second lookup table unit 202, and output the (valid_cnt)th element in the precoding matrix according to the row number valid_cnt input by the counter 102; here, the element output control unit 204 can be implemented by a two-to-one multiplexer.

Specifically, as mentioned above, if the elements from the zeroth row to the third row in the precoding matrix $W_{m,n}^{(1)}$ form a 4×1 matrix M, then the matrix M is equal to $$\frac{1}{\sqrt{8}} v_m,$$

that is, the matrix M is only dependent on the first parameter m. Because the values of m are a limited set, $$\frac{1}{\sqrt{8}} v_m$$

corresponding to all the m can be calculated in advance and stored in the first lookup table unit 201, so that the element Mi of the ith row in the matrix M can be obtained when i×m is taken as the base address to search the first lookup table unit 201, where 0≤i≤3, and i is an integer.

Correspondingly, if the elements from the fourth row to the seventh row in the precoding matrix $W_{m,n}^{(1)}$ form a 4×1 matrix N, then the matrix N is equal to $$\frac{1}{\sqrt{8}}$$

$\phi_n v_m = \phi_n M$, where $\phi_n$ can be regarded as an operator; the operator is only dependent on the second parameter n. Because the values of n are a limited set, $\phi_n$ corresponding to all the n can be calculated in advance and stored in the second lookup table unit 202, so that the values of the operator $\phi_n$ corresponding to the n can be obtained when the n is taken as the base address to search the second lookup table unit 202, and then the element Ni of the ith row in the matrix N is calculated; Ni is equal to $\phi_n$Mi, and corresponds to the element of the (i+4)th row in the precoding matrix $W_{m,n}^{(1)}$.

When the element of the kth row in the precoding matrix $W_{m,n}^{(1)}$ is marked as Wk, obviously, when 0≤k≤3, i=k, and Wk=Mi; when 4≤k≤7, i=k−4, and Wk=Ni=$\phi_n$Mi, wherein 0≤k≤7, and k is an integer.

Therefore, as shown in FIG. 2, the first lookup table address unit 203 receives the 0-4 bits, namely m[4:0], of the first parameter m which is sent by the parameter calculator 101, and receives the 0-1 bits, namely valid_cnt[1:0], of the row number valid_cnt which is sent by the counter 102; the base address i×m of the first lookup table is obtained by using the characteristic of the four-to-one multiplexer, where i is the value represented by valid_cnt[1:0]; obviously 0≤i≤3, and i is an integer; the base address i×m is sent to the first lookup table unit 201.

The first lookup table unit 201 is arranged to obtain the corresponding Mi according to the base address i×m, and send the Mi to the second lookup table unit 202 and the element output control unit 204.

The second lookup table unit 202 is arranged to receive the Mi sent by the first lookup table unit 201, receive the second parameter n sent by the parameter calculator 101, obtain the corresponding operator $\phi_n$ according to the second parameter n and calculate $\phi_n$Mi, namely Ni, and send the Ni to the element output control unit 204.

When 0≤valid_cnt≤3, the second bit of the valid_cnt, namely valid_cnt[2], is 0; by using the characteristic of the two-to-one multiplexer, the element output control unit 204 outputs the received Mi, namely the elements from the zeroth row to the third row in the precoding matrix $W_{m,n}^{(1)}$;

when 4≤valid_cnt≤7, the second bit of the valid_cnt, namely valid_cnt[2], is 1; by using the characteristic of the two-to-one multiplexer, the element output control unit 204 outputs the Ni sent by the second lookup table unit 202, namely the elements from the fourth row to the seventh row in the precoding matrix $W_{m,n}^{(1)}$.

After the elements from the zeroth row to the seventh row in the precoding matrix $W_{m,n}^{(1)}$ are output, the precoding matrix $W_{m,n}^{(1)}$ is generated.

All of the parameter calculator, the counter and the element generator in the device for generating a precoding matrix provided by the embodiment of the disclosure, and these units in the element generator can be implemented by a processor in the terminal or a specific logic circuit; in the specific implementation, the processor can be a Central Processing Unit (CPU), a Microprocessor Unit (MPU), a Digital Signal Processor (DSP) or a Field Programmable Gate Array (FPGA).

The device for generating a precoding matrix provided by the above embodiment can generate a precoding matrix through simple calculation and table lookup, thereby avoiding consuming a large number of storage units.

Figure 3:
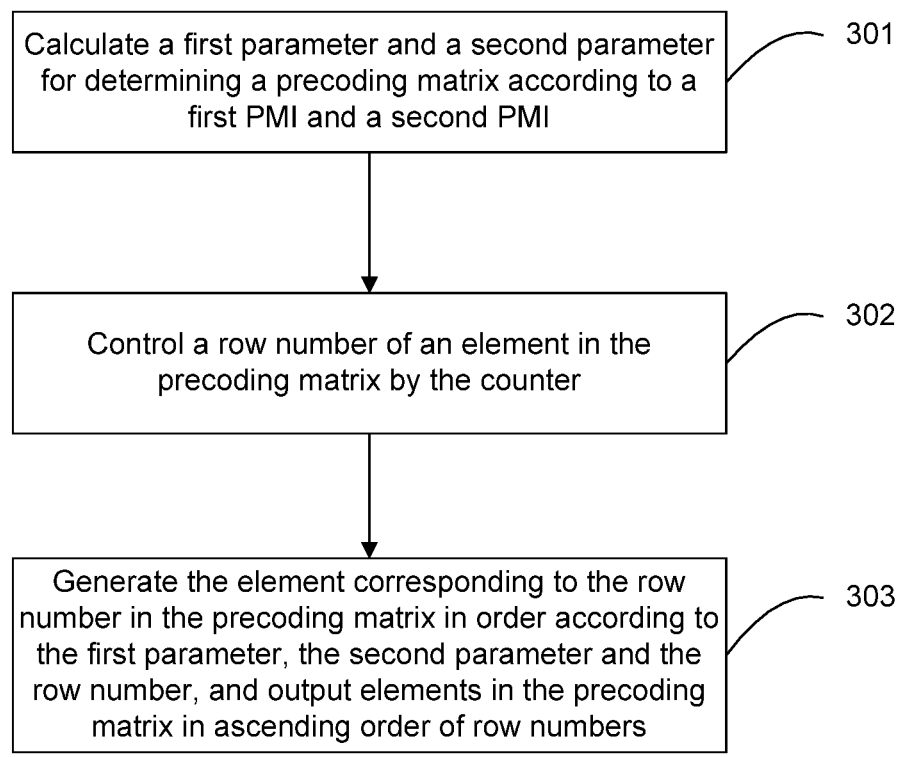
FIG. 3 is a flowchart of a method for generating the precoding matrix according to an embodiment of the disclosure.

FIG. 3 is a flowchart of a method for generating a precoding matrix provided by the disclosure; as shown in FIG. 3, the method includes the following steps.

In Step 301, the first parameter and the second parameter for determining the precoding matrix are calculated according to the first PMI and the second PMI.

In Step 302, a row number of an element in the precoding matrix is controlled by the counter.

In Step 303, the element corresponding to the row number in the precoding matrix is generated in order according to the first parameter, the second parameter and the row number.

Furthermore, before performing Step 303, the method further includes the following steps.

The values of the elements from the zeroth row to the third row in the precoding matrix are calculated in advance, and the corresponding relationships between the values of the elements and the first parameter are established, and the corresponding relationships are stored in the first lookup table; and the values of the operator influencing the elements from the fourth row to the seventh row in the precoding matrix are calculated in advance, and corresponding relationships between the values of the operator and the second parameter are established, and the corresponding relationships are stored in the second lookup table.

Therefore, in the method for generating a precoding matrix, Step 303 may include the following steps.

The base address of the first lookup table is generated according to the first parameter and the row number; the value of the first element is obtained from the first lookup table according to the base address; a value of the operator is obtained from the second lookup table according to the second parameter; when the row number is from the zeroth row to the third row, the value of the first element is output as the value of the element corresponding to the row number in the precoding matrix; and when the row number is from the fourth row to the seventh row, the product of the value of the first element and the value of the operator is calculated and output as the value corresponding to the row number in the precoding matrix.

In order to generate the base address of the first lookup table according to the first parameter and the row number, specifically, the base address of the first lookup table is generated according to the zeroth bit to the fourth bit of the first parameter and the zeroth bit to the first bit of the row number.

It is to be noted that, in the embodiment of the disclosure, if the method for generating a precoding matrix is implemented by software function modules, and the software function modules are sold or used as independent products, they can also be stored in a computer readable storage medium. Based on this understanding, the technical solutions in the embodiments of the disclosure substantially or the part making a contribution to the traditional art can be embodied in the form of software product; the computer software product is stored in a storage medium and includes a number of instructions to make a computer device (which can be a personal computer, a server or a network device, etc.) perform all or part of the method in each embodiment of the disclosure. The above storage medium includes: a USB flash disk, a mobile hard disk, an ROM, a magnetic disk or a compact disc, and other media which can store program codes. In this way, the disclosure is not limited to any particular combination of hardware and software.

Correspondingly, the embodiment of the disclosure also provides a computer storage medium, which stores computer executable instructions for performing the method for generating a precoding matrix provided in the embodiments of the disclosure.

Those skilled in the art should understand that the embodiments of the disclosure can provide a method, a system or a computer program product. Thus, forms of hardware embodiments, software embodiments or embodiments integrating software and hardware can be adopted in the disclosure. Moreover, a form of the computer program product implemented on one or more computer available storage media (including, but not limited to, a disk memory, an optical memory and the like) containing computer available program codes can be adopted in the disclosure.

The disclosure is described with reference to flowcharts and/or block diagrams of the method, the equipment (system) and the computer program product according to the embodiments of the disclosure. It should be understood that each flow and/or block in the flowcharts and/or the block diagrams and a combination of the flows and/or the blocks in the flowcharts and/or the block diagrams can be implemented by computer program instructions. These computer program instructions can be provided for a general computer, a dedicated computer, an embedded processor or processors of other programmable data processing devices to generate a machine, so that an apparatus for realizing functions assigned in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that processing implemented by the computers is generated by executing a series of operation steps on the computers or the other programmable devices, and therefore the instructions executed on the computers or the other programmable devices provide a step of implementing the functions designated in one or more flows of the flowcharts and/or one or more blocks of the block diagrams.

The above is only the preferred embodiments of the disclosure and not intended to limit the scope of protection of the disclosure.

INDUSTRIAL APPLICABILITY

In the disclosure, the first parameter and the second parameter for determining the precoding matrix are calculated according to the first PMI and the second PMI; the row number of the element in the precoding matrix is controlled by the counter; the element corresponding to the row number in the precoding matrix is generated in order according to the first parameter, the second parameter and the row number; and the element in the precoding matrix are output in an ascending order of row numbers; in such a manner, a precoding matrix can be generated through simple calculation and table lookup, thereby avoiding consuming a large number of storage units.

What is claimed is:

1. A device for generating a precoding matrix, comprising: a parameter calculator, a counter and an element generator; wherein, the parameter calculator is arranged to calculate, according to a first Precoding Matrix Identifier (PMI) and a second PMI, a first parameter and a second parameter for determining the precoding matrix, and send the first parameter and the second parameter to the element generator;

the counter is arranged to control a row number of an element in the precoding matrix that is to be generated by the element generator; and the element generator is arranged to generate the element corresponding to the row number in the precoding matrix according to the received first parameter and second parameter and the row number.

2. The device for generating a precoding matrix according to claim 1, wherein the element generator comprises: a first lookup table unit, a second lookup table unit, a first lookup table address unit, and an element output control unit; wherein, he first lookup table unit is arranged to store values of elements from a zeroth row to a third row in the precoding matrix calculated in advance, obtain, according to a base address input by the first lookup table address unit, a value of the corresponding element and output the value of the corresponding element;

the second lookup table unit is arranged to store values of an operator influencing elements from a fourth row to a seventh row in the precoding matrix calculated in advance, inquire a value of the operator according to the second parameter, calculate product of the value of the element output by the first lookup table unit and the value of the operator, and send the product to the element output control unit as the value of the corresponding element from the fourth row to the seventh row in the precoding matrix;

the first lookup table address unit is arranged to generate the base address of the first lookup table unit according to the first parameter and the row number, and send the base address to the first lookup table unit; and the element output control unit is arranged to receive inputs of the first lookup table unit and the second lookup table unit, and output, according to the row number input by the counter, the element of the precoding matrix corresponding to the row number.

3. The device for generating a precoding matrix according to claim 2, wherein the first lookup table address unit is implemented by a four-to-one multiplexer.

4. The device for generating a precoding matrix according to claim 2, wherein the element output control unit is implemented by a two-to-one multiplexer.

5. The device for generating a precoding matrix according to claim 1, wherein the precoding matrix is:

$$W_{m,n}^{(1)} = \frac{1}{\sqrt{8}} \begin{bmatrix} v_m \\ \phi_n v_m \end{bmatrix}, \text{ where } v_m = [\,1 \quad e^{j2\pi m/32} \quad e^{j4\pi m/32} \quad e^{j6\pi m/32}\,]^T,$$

$\phi_n = e^{j\pi n/2}$, e is a natural number, π is Pi, and parameters m and n are calculated by a Long Term Evolution (LTE) terminal according to the first PMI and the second PMI.

6. A method for generating a precoding matrix, executed by a Long Term Evolution (LTE) terminal, the method comprising:

calculating a first parameter and a second parameter for determining the precoding matrix according to a first Precoding Matrix Identifier (PMI) and a second PMI;

controlling a row number of an element in the precoding matrix by a counter;

generating in order the element corresponding to the row number in the precoding matrix according to the first parameter, the second parameter and the row number;

outputting elements in the precoding matrix in an ascending order of row numbers to generate a precoding matrix to avoid pre-storing of all precoding matrices in a storage device of the LTE terminal, wherein the generated precoding matrix is used by the LTE terminal to calculate a Channel Quality Indicator (CQI); and before generating in order the element corresponding to the row number in the precoding matrix according to the first parameter, the second parameter and the row number, the method further comprises:

calculating values of elements from a zeroth row to a third row in the precoding matrix, and establishing corresponding relationships between the values of the elements and the first parameter, and storing the corresponding relationships in a first lookup table; and calculating values of an operator influencing elements from a fourth row to a seventh row in the precoding matrix, and establishing corresponding relationships between the values of the operator and the second parameter, and storing the corresponding relationships in a second lookup table.

7. The method for generating a precoding matrix according to claim 6, wherein generating in order the element corresponding to the row number in the precoding matrix according to the first parameter, the second parameter and the row number comprises:

generating a base address of the first lookup table according to the first parameter and the row number;

obtaining a value of a first element from the first lookup table according to the base address;

obtaining the value of the operator from the second lookup table according to the second parameter;

when the row number is from the zeroth row to the third row, outputting the value of the first element as the value of the element corresponding to the row number in the precoding matrix; and when the row number is from a fourth row to a seventh row, calculating and outputting a product of the value of the first element and the value of the operator as the value corresponding to the row number in the precoding matrix.

8. The method for generating a precoding matrix according to claim 7, wherein generating the base address of the first lookup table according to the first parameter and the row number comprises:

generating the base address of the first lookup table according to a zeroth bit to a fourth bit of the first parameter and a zeroth bit to a first bit of the row number.

9. The method for generating a precoding matrix according to claim 6, wherein the precoding matrix is:

$$W_{m,n}^{(1)} = \frac{1}{\sqrt{8}} \begin{bmatrix} v_m \\ \phi_n v_m \end{bmatrix}, \text{ where } v_m = [\,1 \quad e^{j2\pi m/32} \quad e^{j4\pi m/32} \quad e^{j6\pi m/32}\,]^T,$$

$\phi_n = e^{j\pi n/2}$, e is a natural number, π is Pi, and parameters m and n are calculated by the LTE terminal according to the first PMI and the second PMI.

10. A non-transitory computer storage medium storing computer executable instructions for performing a method for generating a precoding matrix, the method comprising:

calculating a first parameter and a second parameter for determining the precoding matrix according to a first Precoding Matrix Identifier (PMI) and a second PMI;

controlling a row number of an element in the precoding matrix by a counter;

generating in order the element corresponding to the row number in the precoding matrix according to the first parameter, the second parameter and the row number;

outputting elements in the precoding matrix in an ascending order of row numbers to generate a precoding matrix to avoid pre-storing of all precoding matrices in a storage device of a Long Term Evolution (LTE) terminal, wherein the generated precoding matrix is used by the LTE terminal to calculate a Channel Quality Indicator (CQI); and before generating in order the element corresponding to the row number in the precoding matrix according to the first parameter, the second parameter and the row number, the method further comprises:

calculating values of elements from a zeroth row to a third row in the precoding matrix, and establishing corresponding relationships between the values of the elements and the first parameter, and storing the corresponding relationships in a first lookup table; and calculating values of an operator influencing elements from a fourth row to a seventh row in the precoding matrix, and establishing corresponding relationships between the values of the operator and the second parameter, and storing the corresponding relationships in a second lookup table.

11. The non-transitory computer storage medium according to claim 10, wherein generating in order the element corresponding to the row number in the precoding matrix according to the first parameter, the second parameter and the row number comprises:

generating a base address of the first lookup table according to the first parameter and the row number;

obtaining a value of a first element from the first lookup table according to the base address;

obtaining the value of the operator from the second lookup table according to the second parameter;

when the row number is from the zeroth row to the third row, outputting the value of the first element as the value of the element corresponding to the row number in the precoding matrix; and when the row number is from a fourth row to a seventh row, calculating and outputting a product of the value of the first element and the value of the operator as the value corresponding to the row number in the precoding matrix.

12. The non-transitory computer storage medium according to claim 11, wherein generating the base address of the first lookup table according to the first parameter and the row number comprises:

generating the base address of the first lookup table according to a zeroth bit to a fourth bit of the first parameter and a zeroth bit to a first bit of the row number.

13. The non-transitory computer storage medium according to claim 10, wherein the precoding matrix is:

$$W_{m,n}^{(1)} = \frac{1}{\sqrt{8}} \begin{bmatrix} v_m \\ \phi_n v_m \end{bmatrix}, \text{ where } v_m = [\ 1 \quad e^{j2\pi m/32} \quad e^{j4\pi m/32} \quad e^{j6\pi m/32}\ ]^T,$$

$\phi_n = e^{j\pi n/2}$, e is a natural number, $\pi$ is Pi, and parameters m and n are calculated by the LTE terminal according to the first PMI and the second PMI.

* * * * *